(12) United States Patent  (10) Patent No.: US 8,897,331 B2
Yamamoto et al.  (45) Date of Patent: Nov. 25, 2014

(54) LASING DEVICE

(71) Applicant: Panasonic Corporation, Osaka (JP)

(72) Inventors: Atsuki Yamamoto, Osaka (JP); Tetsuji Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/278,146

(22) Filed: May 15, 2014

(65) Prior Publication Data

US 2014/0247855 A1  Sep. 4, 2014

Related U.S. Application Data

(63) Continuation of application No. PCT/JP2013/001637, filed on Mar. 13, 2013.

(30) Foreign Application Priority Data

May 18, 2012  (JP) ................................. 2012-114364

(51) Int. Cl.
*H01S 3/223* (2006.01)
*H01S 3/036* (2006.01)
*H01S 3/134* (2006.01)
*H01S 3/104* (2006.01)
*H01S 3/10* (2006.01)

(52) U.S. Cl.
CPC ................. *H01S 3/036* (2013.01); *H01S 3/134* (2013.01); *H01S 3/104* (2013.01); *H01S 3/2232* (2013.01); *H01S 3/10069* (2013.01)
USPC .............................................. 372/58; 372/55

(58) Field of Classification Search
CPC ................................. H01S 3/036; H01S 3/2366
USPC .......................................................... 372/58
See application file for complete search history.

(56) References Cited

U.S. PATENT DOCUMENTS

2007/0297478 A1  12/2007  Kurushima et al.
2011/0243177 A1  10/2011  Nishio et al.
2013/0315274 A1  11/2013  Murakami et al.

FOREIGN PATENT DOCUMENTS

| JP | 61-154189 A | 7/1986 |
| JP | 62-214686 A | 9/1987 |
| JP | 01-128581 A | 5/1989 |
| JP | 04-080979 A | 3/1992 |
| JP | 09-266342 A | 10/1997 |
| JP | 10-173274 A | 6/1998 |
| JP | 2001-244525 A | 9/2001 |
| JP | 2002-319724 A | 10/2002 |
| JP | 2003-110172 A | 4/2003 |
| JP | 2006-229258 A | 8/2006 |
| JP | 2010-212553 A | 9/2010 |
| JP | 2011-228624 A | 11/2011 |
| WO | 2005/104308 A1 | 11/2005 |

OTHER PUBLICATIONS

International Search Report for Application No. PCT/JP2013/001637 dated Jun. 18, 2013.

*Primary Examiner* — Yuanda Zhang
(74) *Attorney, Agent, or Firm* — Panasonic Patent Center

(57) ABSTRACT

Upon starting the lasing device after having a stop state, gas retaining in the gas circulation path and the optical resonator is released through the gas release valve opened by the gas pressure controller. During a time calculated by the open-time calculator in response to the immediately preceding stop time of the lasing device, laser medium gas in the piping between the laser medium gas supply device and the gas supply valve is released, together with the retaining gas, through the gas supply valve opened by the gas pressure controller. The structure reduces costs by using decreased number of valves and suppresses consumption of laser medium gas.

16 Claims, 7 Drawing Sheets

Flow of laser medium gas

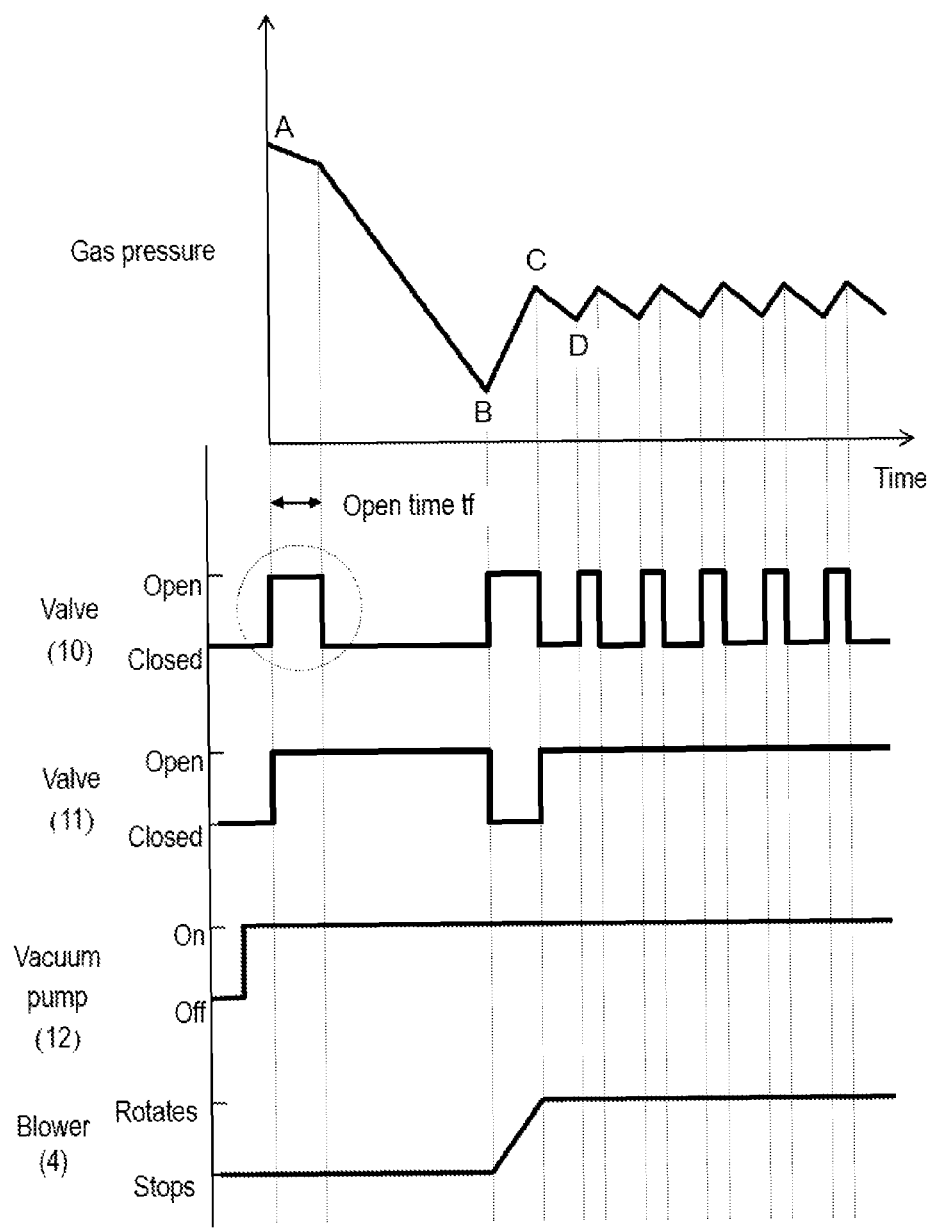

LASING DEVICE

BACKGROUND

1. Technical Field

The present invention relates to a lasing device using laser medium gas.

2. Background Art

Lasing devices can process a workpiece with no contact and minimized thermal adverse effect. The advantages allow the devices to be in heavily usage: cutting various materials into various shapes, welding, and processing.

Particularly, a $CO_2$-gas lasing device, which employs $CO_2$-based mixed gas as laser medium gas, has been widely used because of its excellent laser-beam characteristics and relatively easily obtained significant output.

Such a gas lasing device has an optical resonator and a gas circulation path connected to the optical resonator. Laser medium gas, which is heated by discharge excitation in the optical resonator, is cooled down while circulating through the gas circulation path.

The gas circulation path has a blower for circulating the laser medium gas.

Generally, as a laser medium gas supply device, a gas canister filled with a mixed gas in advance is employed. A piping structural member made of resin or metal is used for piping for connecting between the gas canister and a gas supply valve of the lasing device. However, if such a piping structural member has a tiny pin hole, for example, in a $CO_2$-gas lasing device, helium (He) included in the mixed gas can selectively escape through the pin hole. The leakage can cause change in the mixture ratio of the laser medium gas retaining in the piping between the gas canister and the gas supply valve of the lasing device, by which stable laser output cannot be obtained.

First, a conventional lasing device is described. FIG. 7 shows a conventional lasing device.

FIG. 7 shows a piping system of a laser gas supply system for supplying gas to gas line 910 of a laser gas circulation system of the gas lasing device. Fed from laser gas canister 914, the laser gas is supplied to gas line 910 via primary pressure regulator 915, piping 916, filter 917, pressure regulator 918, valve 919, valve 920, quick supply flowmeter 921, and normal supply flowmeter 922. The pressure in gas line 910 is measured by pressure sensor 923. The gas in gas line 910 is released by vacuum pump 924 via quick release valve 925 or normal release valve 926. In the conventional structure shown in FIG. 7, with use of release valve 927 and timer 928, the laser medium gas retaining in piping 916 between gas canister 914 and gas line 910 is released outside at the start up of the gas lasing device.

FIG. 8 shows an open/Close sequence of each valve of the conventional gas lasing device. In the conventional lasing device of FIG. 7, prior to gas supply from gas canister 914, release valve 927 is maintained open while the gas retaining in the lasing device is being released (i.e., while valves 925 and 926 are both maintained open). In this way, the laser medium gas retaining in piping 916 is released outside at the start up of the device for providing laser output with stability (see Japanese Unexamined Patent Application Publication No. H04-080979, for example).

SUMMARY

The conventional lasing device, however, needs dedicated release valve 927. Besides, the open time of release valve 927 is determined to a maximum time for releasing gas corresponding to the volume of piping 916 connecting between gas canister 914 and the lasing device. Therefore, when the lasing device has a short stop time, the laser medium gas has been released more than necessary.

To address the problem above, the present invention provides a lasing device not only capable of decreasing cost by using decreased number of valves, but also capable of suppressing consumption of laser medium gas.

The lasing device of the present invention supplies laser medium gas from outside continuously or intermittently. The lasing device of the present invention has an optical resonator, a gas circulation path, a laser medium gas supply device, a gas release pump, a gas pressure detector, a gas pressure controller, a blower, a current detector, a stop-time counter, a storage, and an open-time calculator. The gas circulation path is connected to the optical resonator. The laser medium gas supply device supplies the gas circulation path or the optical resonator with laser medium gas via a gas supply valve. The gas release pump releases the laser medium gas from the gas circulation path or the optical resonator via a gas release valve. The gas pressure detector detects the gas pressure of the laser medium gas in the gas circulation path or the optical resonator. In response to the gas pressure detected by the gas pressure detector, the gas pressure controller controls the gas supply valve and the gas release valve. The blower is disposed in the gas circulation path. The current detector detects blower driving current of the blower. The stop-time counter measures the stop time of the lasing device. The storage stores correlated information between the stop time and blower driving current. In response to the information from the storage, the open-time calculator calculates the open time of the gas supply valve at the start up of the lasing device. Upon starting up the lasing device after having a stop state, the gas retaining in the gas circulation path and the optical resonator is released through the gas release valve opened by the gas pressure controller. During the time calculated by the open-time calculator in response to the last stop time of the lasing device, laser medium gas in the piping between the laser medium gas supply device and the gas supply valve is released, together with retaining gas, through the gas supply valve opened by the gas pressure controller.

With the structure above, the retaining gas is released—by only a required amount of it—outside the lasing device, even if the mixture ratio of the laser medium gas (retaining in the piping between the gas canister and the gas supply valve of the lasing device) varies in the stop time of the lasing device. The structure decreases the number of valves used for the device, and accordingly achieves cost reduction. Further, the structure, suppresses consumption of laser medium gas.

BRIEF DESCRIPTION OF THE DRAWINGS

FIG. 3 is a diagram showing the open/close sequence of each valve of the lasing device of the exemplary embodiment of the present invention.

DETAILED DESCRIPTION OF THE PREFERRED EMBODIMENTS EXEMPLARY EMBODIMENT

Hereinafter, an example of the exemplary embodiment of the present invention is described with reference to the accompanying drawings.

Figure 1:
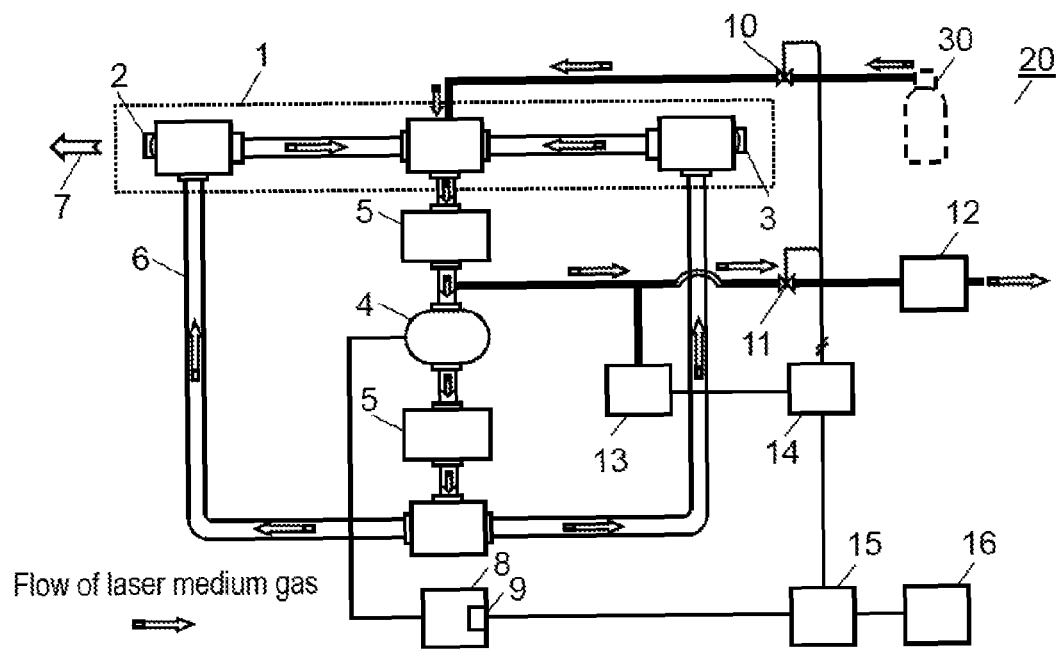
FIG. 1 is a block diagram showing the lasing device of an exemplary embodiment of the present invention.

In FIG. 1, optical resonator 1 is formed of half mirror 2 and total reflecting mirror 3 disposed so as to face half mirror 2.

Gas circulation path 6 is connected to optical resonator 1, and they form a laser medium gas passage. Blower 4, whose rotation is controlled at a predetermined number of rotations by inverter 8, circulates laser medium gas through the laser medium gas passage.

The driving current for blower 4 is detected by current detector 9 that is disposed in inverter 8.

Heat exchangers 5, which are disposed in gas circulation path 6, cool down the laser medium gas circulating through the laser medium gas passage.

A high-voltage supply (not shown) produces discharge excitation in optical resonator 1, and blower 4 provides the laser medium gas with compresqion for circulating, which increases the temperature of the laser medium gas.

Heat exchangers 5 cool down the laser medium gas circulating through the laser medium gas passage to protect optical resonator 1 from having an excessive high temperature.

One of heat exchangers 5 is located on the side of the downstream of laser-medium-gas flow (hereinafter, referred to as the downstream side) of optical resonator 1 and is located on the side of the upstream of the laser-medium-gas flow thereinafter, referred to as the upstream side) of blower 4. The other one of heat exchangers 5 is located on the downstream side of blower 4. Such positioned heat exchangers quickly cool down the heated laser medium gas.

Gas canister 30 supplies the laser medium gas to the laser medium gas passage (formed of optical resonator 1 and gas circulation path 6) via gas supply valve 10. Gas canister 30, which is a laser medium gas supply device, is disposed outside lasing device 20. In the structure of the exemplary embodiment, gas supply valve 10 is connected to optical resonator 1.

The laser medium gas circulates through the laser medium gas passage formed of optical resonator 1 and gas circulation path 6 and is released outside the laser medium gas passage by vacuum pump 12 via gas release valve 11. Although gas release valve 11 is connected to gas circulation path 6 on the upstream side of blower 4 in the structure, it is not limited to. Gas release valve 11 may be disposed in some other place in gas circulation path 6.

Gas supply valve 10 and gas release valve 11 are made of a solenoid valve. Gas pressure controller 14 (that will be described later) performs open/close control of them.

The laser medium gas in optical resonator 1 needs to be controlled at an optimum gas pressure for offering constant intensity of laser beam 7.

According to the embodiment, gas pressure detector 13 detects the gas pressure of the laser medium gas circulating through the laser medium gas passage formed of optical resonator 1 and gas circulation path 6. Further, gas pressure detector 13 outputs a gas pressure signal, which is an electric signal proportional to the detected gas pressure, to gas pressure controller 14. In the structure of the embodiment, gas pressure detector 13 is connected between gas circulation path 6 and gas release valve 11, but it is not limited to. Gas pressure detector 13 may be connected to gas circulation path 6 or optical resonator 1.

Gas pressure controller 14 carries out open/close control of gas supply valve 10 and gas release valve 11 so that the laser medium gas in optical resonator 1 has a predetermined gas pressure.

Next, the correlation of blower driving current with the stop time of the lasing device will be described with reference to FIG. 2A through FIG. 2C.

The load on blower 4 increases in proportion to the density of the laser medium gas. The increase in load on blower 4 increases blower driving current fed from inverter 8. The blower driving current is detected by built-in current detector 9 of inverter 8.

Figure 2A:
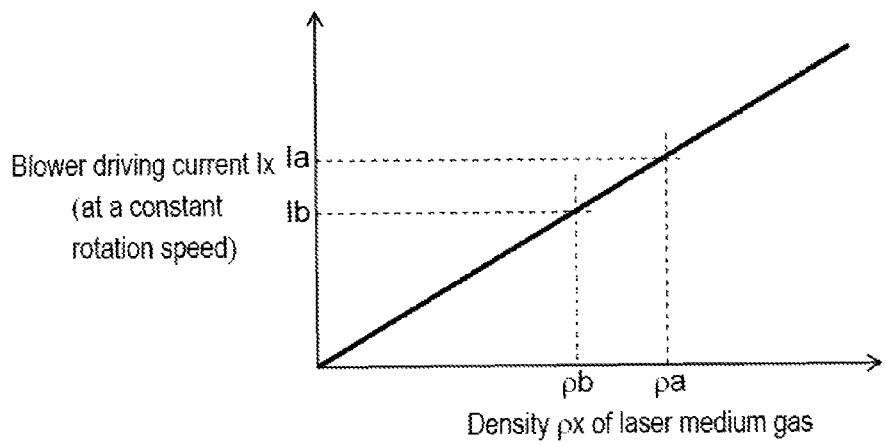
FIG. 2A is a graph showing correlation of the density of the laser medium gas with blower driving current of the exemplary embodiment of the present invention.

As shown in the graph of FIG. 2A, blower driving current Lx increases in proportion to density $\rho x$ of laser medium gas. Blower driving current. Ix is represented by expression (1), and gradient $\alpha$ is represented by expression (2) as follows:

$$Lx = \alpha \cdot \rho x \tag{1},$$

$$\text{gradient } \alpha = (Ia - Ib)/(\rho a - \rho b) \tag{2}.$$

For example, in a $CO_2$-gas lasing device, if the piping between gas canister 30 (i.e., the laser medium gas supply device) and gas supply valve 10 has a tiny pin hole, helium (He) included in the mixed gas can selectively escape through the pin hole. The leakage causes change in the mixture ratio of the laser medium gas retaining in the piping between gas canister 30 and gas supply valve 10 of the lasing device.

When the lasing device is in the stop state, the mixture ratio of the retaining gas keeps changing during the stop time of the device. As shown in the graph of FIG. 2B, density $\rho x$ of the laser medium gas retaining in the lasing device increases in proportion to the stop time of the device.

Figure 2B:
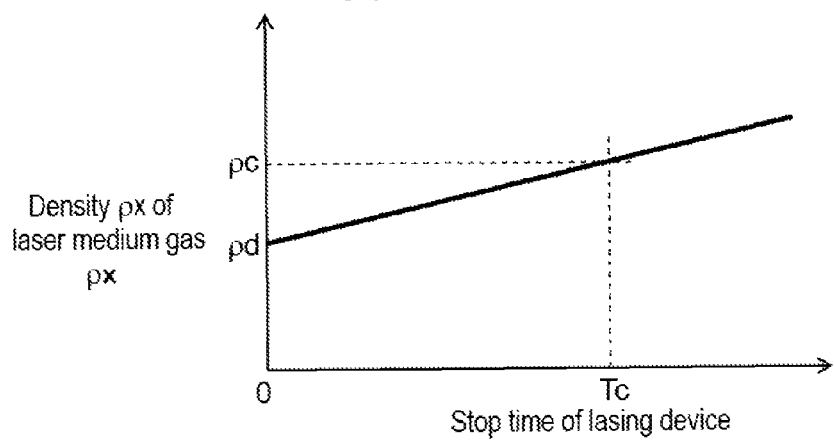
FIG. 2B is a graph showing correlation of the density of the laser medium gas with the stop time of the lasing device of the exemplary embodiment of the present invention.
Figure 2C:
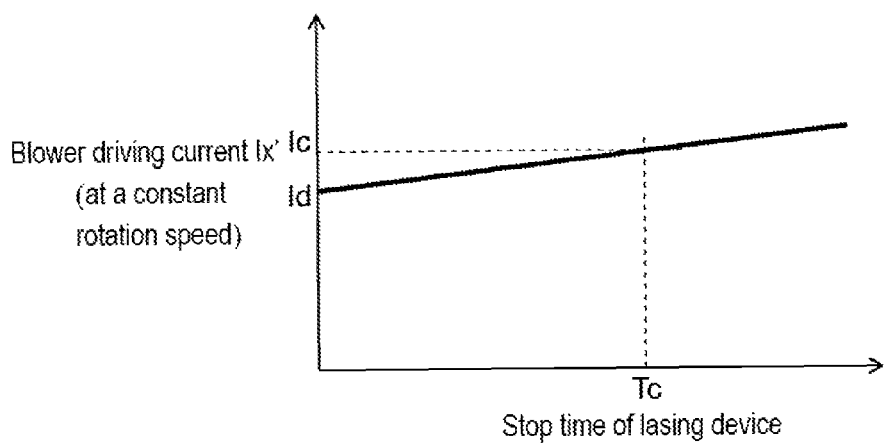
FIG. 2C is a graph showing correlation of the blower driving current with the stop time of the lasing device of the exemplary embodiment of the present invention.

The graph of FIG. 2C is obtained in a manner that each relation of valuables shown in FIG. 2A and FIG. 2B are integrated and then replaced with relation of driving current ix for blower 4 with respect to the stop time of the lasing device. The graph of FIG. 2C shows that driving current Ix' for blower 4, too, increases with the passage of the stop time of the device. The relation is represented by the expressions below:

$$Lx' = \beta \cdot Tx' + Id \tag{3},$$

$$\text{gradient } \beta = (Ic - Id)/Tc \tag{4}.$$

The description below is on the workings of gas supply valve 10 and gas release valve 11 with use of the open/close sequence of the valves shown in FIG. 3.

At the start up of the lasing device, the gas pressure has the level shown by A in the graph. Upon starting up the lasing device, vacuum pump 12 turns on, and then gas release valve 11 and gas supply valve 10 open. Through gas release valve 11, the laser medium gas is released from gas circulation path 6 and optical resonator 1 by vacuum pump 12. At the same time, through gas supply valve 10, fresh laser medium gas from gas canister 30 is fed, together with the laser medium gas retaining in the piping between gas canister 30 and gas supply valve 10, into gas circulation path 6 and optical resonator 1.

That is, the laser medium gas retaining in the piping is fed into lasing device 20 but quickly released from the device by vacuum pump 12.

When gas supply valve 10 becomes open regularly until the gas pressure, lowers to the level of B, the open timing of gas supply valve 10 is not necessarily synchronized with that of gas release valve 11.

After gas supply valve 10 is closed, the gas pressure goes down to level B. When the gas pressure reaches level B, gas release valve 11 is closed, whereas gas supply valve 10 is open and laser medium gas is fed to gas circulation path 6 and optical resonator 1 therethrough. Further, inverter 8 turns on and blower 4 starts rotating.

When the gas pressure increases and reaches level C, gas release valve 11 is open, whereas gas supply valve 10 is closed. When the gas pressure, decreases and reaches level D, gas supply valve 10 is open until the gas pressure increases to level C. When the gas pressure reaches level C again, gas supply valve 10 is closed. In this way, until the lasing device stops, gas pressure controller 14 carries out open/close control of gas supply valve 10 and gas release valve 11 so that the gas pressure is maintained at a level between C and D in response to the detected value by gas pressure detector 13.

The rotation of blower 4 reaches a predetermined speed around the time at which the increasing gas pressure reaches level C, and after that, blower 4 is controlled at a constant speed.

Figure 4:
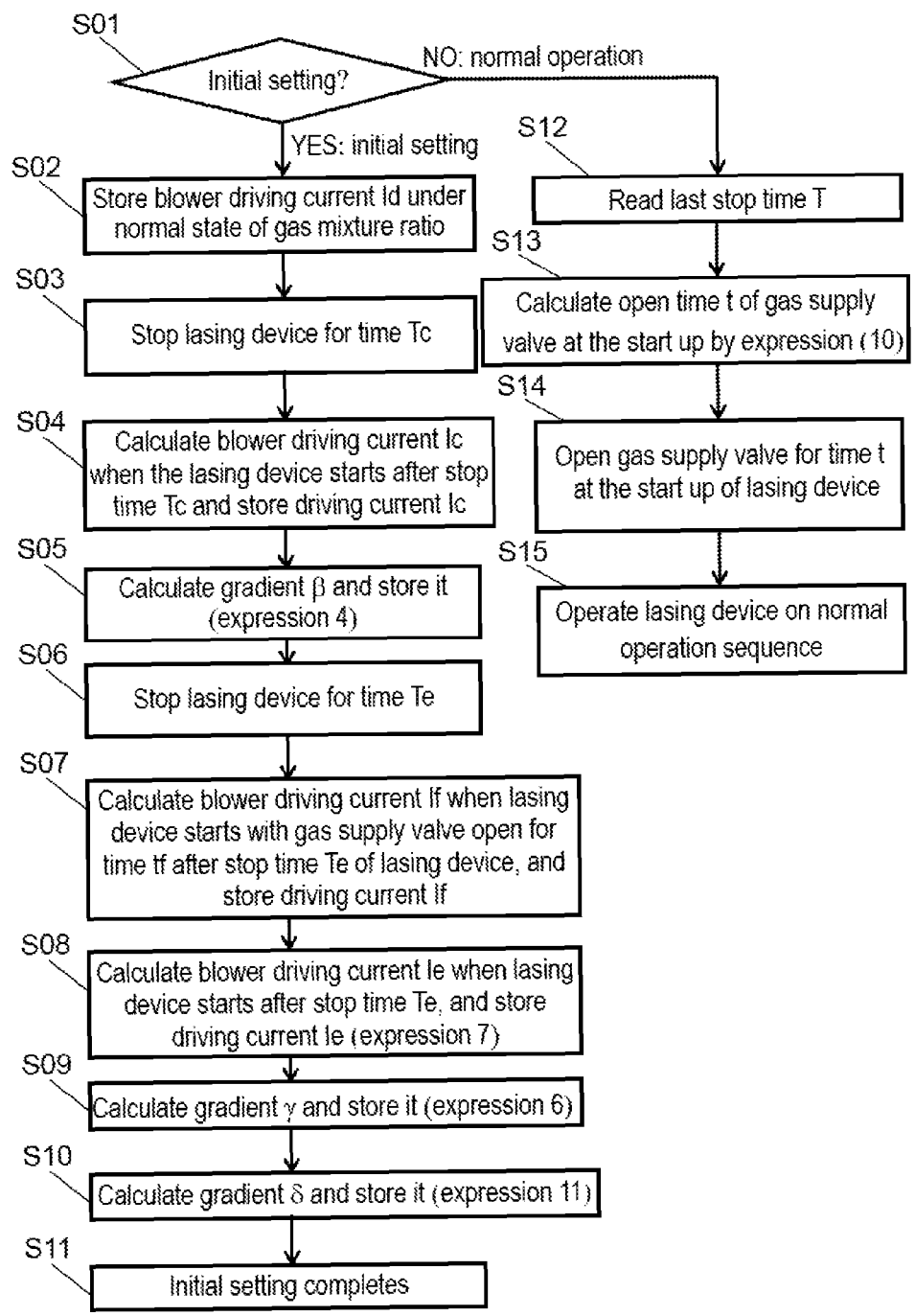
FIG. 4 is a flow chart mainly illustrating the procedures of initial setting of the lasing device of the exemplary embodiment of the present invention.
Figure 5:
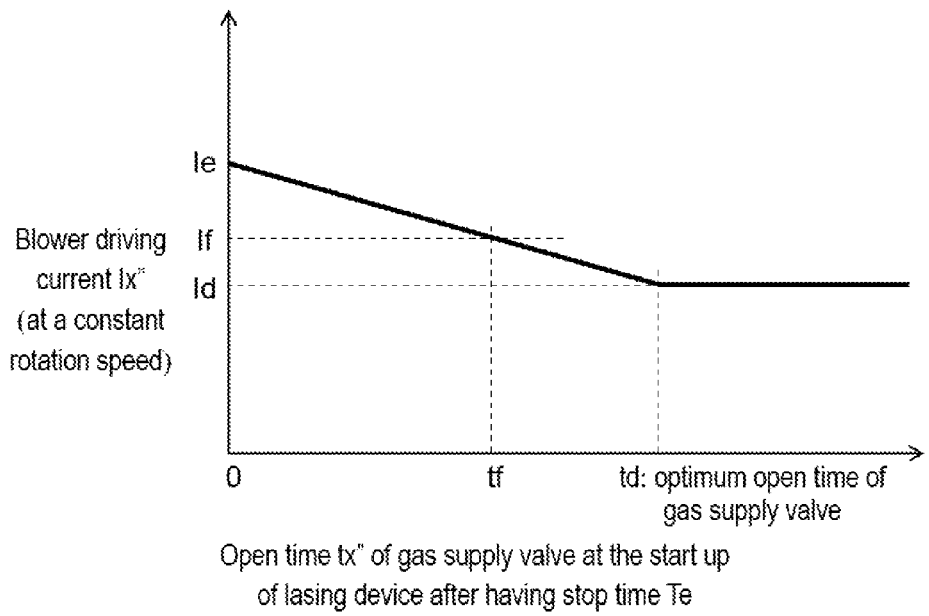
FIG. 5 is a graph illustrating the principle of calculating the open time of the as supply valve of the exemplary embodiment of the present invention.
Figure 6:
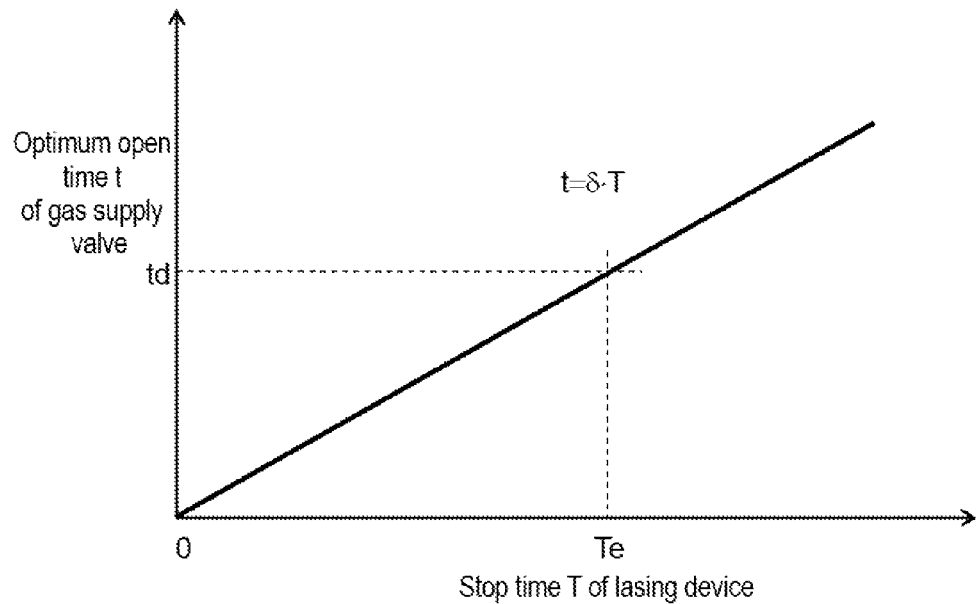
FIG. 6 is a graph for calculating the optimum open time of the gas supply valve of the exemplary embodiment of the present invention.
Figure 7:
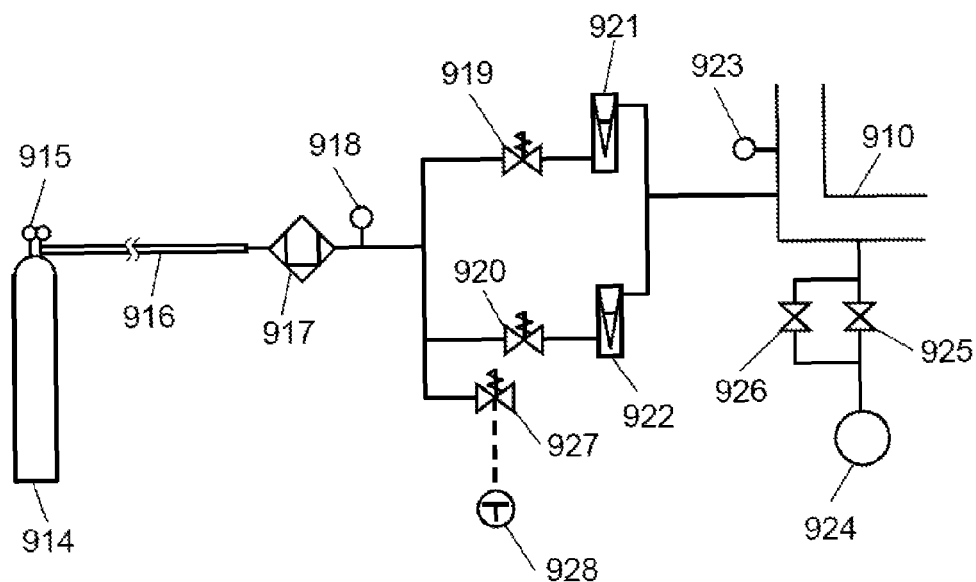
FIG. 7 is a piping system diagram of the laser gas supply system of a conventional gas lasing device.
Figure 8:
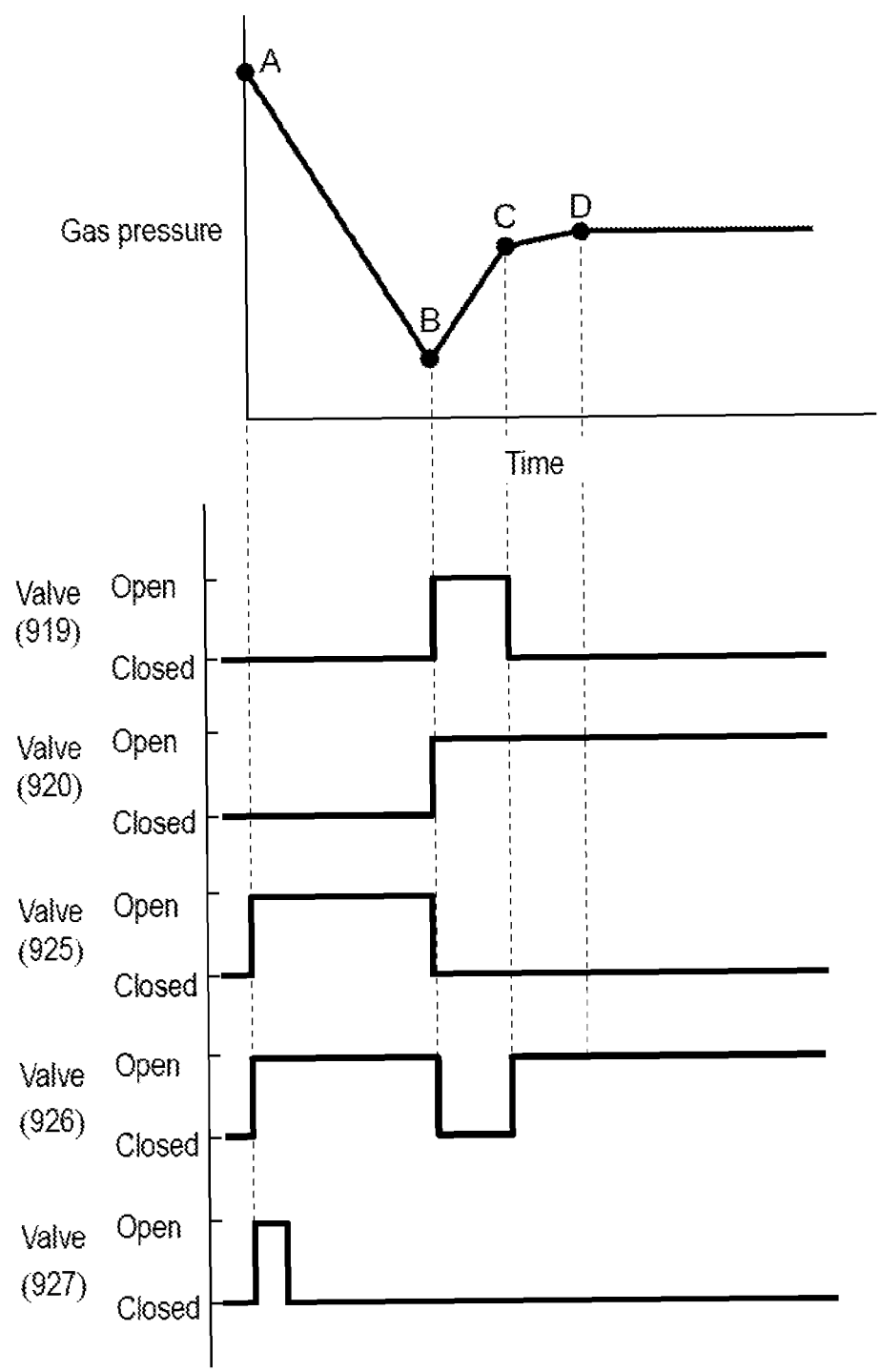
FIG. 8 is a diagram showing the open/close sequence of each valve of the conventional lasing device.

Next, the calculation of the open time of gas supply valve 10 at the start up of the lasing device is described with reference to FIG. 4 through FIG. 6. FIG. 4 is a flow chart of the workings—mainly illustrating the procedures of initial setting—of the lasing device of the exemplary embodiment. Each graph of FIG. 5 and FIG. 6 illustrates the principle of calculation in the initial setting.

Lasing device 20 is placed in an intended working environment and the piping between gas canister 30 and lasing device 20 is installed. After that, the initial setting for calculation of the open time of gas supply valve 10 is carried out.

Step S01 of FIG. 4 is for determining whether the initial setting is performed or not.

When the initial setting is selected, step S02 is performed. In step S02, the laser medium gas retaining in gas circulation path 6, optical resonator 1, and the piping between gas canister 30 and lasing device 20 is completely released. After replacement of laser medium gas, current detector 9 detects blower driving current under the normal condition of the gas mixture ratio. The detected current value is stored as driving current Id in the storage mounted on open-time calculator 15. Driving current Id is the same as that shown in the graph of FIG. 2C.

In step S03, the lasing device is stopped and maintained in the stop state for predetermined stop time Tc. Stop time Tc is counted by stop-time, counter 16 and stored in the storage mounted on open-time calculator 15. Stop time Tc is the same as that shown in the graph of FIG. 2C. Stop time Tc can be arbitrarily determined as long as its length is enough for detecting difference in blower driving current (that will be described later).

After having stop time Tc, the lasing device is turned on in step S04. In the step, current detector 9 detects the blower driving current when blower 4 is controlled at a constant speed. The detected current value is stored as driving current Ic in the storage mounted on open-time calculator 15. Driving current Ic is the same as that shown in the graph of FIG. 2C. In step S04, however, until the gas pressure decreases to level B from level A in response to the start up of the lasing device, gas supply valve 10 is maintained to be closed.

In step S05, open-time calculator 15 calculates gradient β from expression (4) described earlier. Gradient β represents correlation of the blower driving current with the stop time of the lasing device. The calculated value is stored in the storage mounted on open-time calculator 15.

In step S06, the lasing device is stopped and maintained in the stop state for predetermined stop time Te. Stop time Te is counted by stop-time counter 16 and stored in the storage mounted on open-time calculator 15.

After having stop time Te, the lasing device is turned on in step S07. The lasing device is operated on the sequence shown in FIG. 3. Open time tf of the gas supply valve in the sequence has a predetermined value, and it is stored in the storage mounted on open-time calculator 15.

Current detector 9 detects the blower driving current when blower 4 is controlled at a constant speed. The detected current value is stored as driving current If in the storage mounted on open-time calculator 15.

FIG. 5 is a graph showing the relations of aforementioned parameters, such as stop time Te, open time tf of gas supply valve 10, and driving current If. The relations of the parameters are represented by expressions below:

$$Ix'' = Ie - \gamma \cdot tx'' \quad (5)$$

$$\text{gradient } \gamma = (Ie - If)/tf \quad (6),$$

$$Ie = \cdot Te + Id \quad (7),$$

where Te represents a predetermined stop time of the lasing device.

Open time tf of gas supply valve 10 can be arbitrarily determined. However, excessively long open-time tf allows the laser medium gas retaining in the piping (between gas canister 30 and gas supply valve 10 of the lasing device) to be completely released from the lasing device 20 before blower 4 starts rotating. In that case, open-time calculator 15 cannot perform calculation. Preferably, open time tf should be several seconds.

In step S08, open-time calculator 15 calculates blower driving current Ie by expression (7). The calculation is performed under the condition where gas supply valve 10 is maintained to be closed while the gas pressure is decreasing to level B from level A that is the start-up pressure level of the lasing device after having stop time Te. The calculated value of blower driving current Ie is stored in the storage mounted on open-time calculator 15.

In expression (7), Te and Ie correspond to Tx' and Ix' respectively, in expression (3).

In step S09, open-time calculator 15 calculates gradient γ that represents correlation of blower driving current Ie with blower driving current If by expression (6). As described above, blower driving current Ie is obtained under the condition where gas supply valve 10 is maintained to be closed while the gas pressure is decreasing to level B from level A that is the start-up pressure level of the lasing device after having stop time Te. On the other hand, blower driving current If is obtained under the condition where gas supply valve 10 is maintained to be open for time tf while the gas pressure is decreasing to level B from level A. The calculated value of gradient γ, which corresponds to the gradient of the graph of FIG. 5, is stored in the storage mounted on open-time calculator 15.

In step S10, to obtain optimum open time t of gas supply valve 10 from stop time T of the lasing device, proportional constant δ is calculated by expression (11) derived from the expressions below. The calculated value of proportional constant δ, which corresponds to the gradient of the graph of FIG. 6, is stored in the storage mounted on open-time calculator 15.

From expression (5), $$tx'' = (Ie - Ix'')/\gamma \quad (8),$$

further, tx" is replaced with td and IX" is replaced with Id, and by substituting expression (7) for expression (8), the expression becomes, $$td = (\beta \cdot Te + Id - Id)/\gamma = (\beta/\gamma) \cdot Te \quad (9),$$

by generalizing expression (9), $$t = \delta \cdot T \quad (10),$$

$$\delta = \beta/\gamma \quad (11).$$

Through the procedures above, the initial setting is completed (step S11).

Hereinafter, gradient γ and proportional constant δ calculated in the initial setting shown in FIG. 4 will be described in detail with reference to FIG. 5.

Gradient γ represents degree of influence of the open time of gas supply valve 10 on the driving current for blower 4 with respect to stop time T of the lasing device. Through the calculation of gradient γ, blower driving current Id—suitable for the normal mixture ratio of laser medium gas to be supplied to lasing device 20—can be obtained. Further, the open time of gas supply valve 10 capable of offering obtained blower driving current Id is the optimum value as open time t of gas supply valve 10.

However, as shown in the graph of FIG. 6, open time t of gas supply valve 10 is not a fixed value with respect to stop time T of the lasing device, varying as a function of the stop time of the lasing device. That is, value δ calculated above serves as the coefficient thereof.

The general expression—capable of calculating optimum open time t of gas supply valve 10 with respect to stop time T of the lasing device—is thus obtained.

After the completion of the initial setting, the lasing device works on the normal operation procedures Shown in the flowchart of FIG. 4.

In step S12, the device reads stop time T counted by stop-time counter 16. In step S13, open-time calculator 15 calculates open time t (at the start up of the device) of gas supply valve 10 by expression (10). In step S14, gas supply valve 10 is open for time t dining the gas pressure decreases from level A to level B.

After that, the lasing device is operated on the normal operation sequence (step S15).

Besides, the aforementioned values β, γ, and δ should be calculated and stored in a table in advance when the followings have been measured in advance: the distance between gas canister 30 and gas supply valve 10, and the leakage quantity of the piping employed therebetween. This eliminates the processes shown in the flowchart of the initial setting shown in FIG. 3, reducing the time required for installation of the lasing device.

The mixture ratio of laser medium gas—retaining in the piping between the gas canister and the gas supply valve of the lasing device—can vary if the piping has a tiny pin hole and the gas leaks from the hole. The lasing device of the present invention, however, provides laser output with stability in spite of a change in the mixture ratio of laser medium gas due to, for example, the problem above. Further, the structure of the present invention reduces costs by using decreased number of valves and suppresses consumption of laser medium gas. It is therefore useful for the lasing device employing laser medium gas.

What is claimed is:

1. A lasing device providing laser medium gas continuously or intermittently from outside, comprising:
    an optical resonator;
    a gas circulation path connected to the optical resonator;
    a laser medium gas supply device for supplying laser medium gas to the gas circulation path or the optical resonator via a gas supply valve;
    a gas release pump for releasing laser medium gas from the gas circulation path of the optical resonator via a gas release valve;
    a gas pressure detector for detecting gas pressure of the laser medium gas in the gas circulation path or the optical resonator;
    a gas pressure controller for controlling the gas supply valve and the gas release valve in response to the gas pressure detected by the gas pressure detector;
    a blower disposed in the gas circulation path;
    a current detector for detecting blower driving current for the blower;
    a stop-time counter for counting a stop time of the lasing device;
    a storage for storing correlated information of the stop time with the blower driving current; and
    an open-time calculator for calculating an open time of the gas supply valve at a start up of the lasing device in response to the information from the storage,
    wherein, when the lasing device is turned on after having a stop state, gas retaining in the gas circulation path and the optical resonator is released through the gas release valve opened by the gas pressure controller, and
    during a time calculated by the open-time calculator in response to an immediately preceding stop time of the lasing device, laser medium gas in the piping between the laser medium gas supply device and the gas supply valve is released, together with the retaining gas, through the gas supply valve opened by the gas pressure controller.

2. The lasing device according to claim 1, wherein a first device-stop time and a second device-stop time are at least determined by an initial setting operation having a sequence different from a normal operation, and
    in each of the first device-stop time and the second device-stop time, the correlated information is calculated from the blower driving current detected in a state that the lasing device starts to operate with the gas supply valve maintained to be closed and in a state that the lasing device starts to operate after the gas supply valve being open for a predetermined time.

3. The lasing device according to claim 1, wherein the gas supply valve is connected to the optical resonator.

4. The lasing device according to claim 1, wherein the gas release valve is connected to the gas circulation path.

5. The lasing device according to claim 1, wherein the gas pressure detector is connected between the gas circulation path and the gas release valve.

6. The lasing device according to claim 2, wherein the gas supply valve is connected to the optical resonator.

7. The lasing device according to claim 2, wherein the gas release valve is connected to the gas circulation path.

8. The lasing device according to claim 3, wherein the gas release valve is connected to the gas circulation path.

9. The lasing device according to claim 6, wherein the gas release valve is connected to the gas circulation path.

10. The lasing device according to claim 2, wherein the gas pressure detector is connected between the gas circulation path and the gas release valve.

11. The lasing device according to claim 3, wherein the gas pressure detector is connected between the gas circulation path and the gas release valve.

12. The lasing device according to claim 4, wherein the gas pressure detector is connected between the gas circulation path and the gas release valve.

13. The lasing device according to claim 6, wherein the gas pressure detector is connected between the gas circulation path and the gas release valve.

14. The lasing device according to claim 7, wherein the gas pressure detector is connected between the gas circulation path and the gas release valve.

15. The lasing device according to claim 8, wherein the gas pressure, detector is connected between the gas circulation path and the gas release valve.

16. The lasing device according to claim 9, wherein the gas pressure detector is connected between the gas circulation path and the gas release valve.

\* \* \* \* \*